United States Patent
Kuehne

(10) Patent No.: US 10,248,992 B2
(45) Date of Patent: Apr. 2, 2019

(54) PRESENTATION DEVICE FOR CARRYING OUT A PRODUCT PRESENTATION

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 297 days.

(21) Appl. No.: 14/809,657

(22) Filed: Jul. 27, 2015

(65) Prior Publication Data

US 2016/0027099 A1 Jan. 28, 2016

(30) Foreign Application Priority Data

Jul. 26, 2014 (DE) .......................... 10 2014 011 116

(51) Int. Cl.
- G06Q 30/00 (2012.01)
- G06Q 30/06 (2012.01)
- G02B 27/01 (2006.01)

(52) U.S. Cl.
CPC ..... G06Q 30/0643 (2013.01); G06Q 30/0641 (2013.01); G02B 27/017 (2013.01)

(58) Field of Classification Search
CPC ................................................. G06Q 30/0641
USPC ....................................................... 705/27.1
See application file for complete search history.

(56) References Cited

U.S. PATENT DOCUMENTS

| | | |
|---|---|---|
| 5,515,268 A | 5/1996 | Yoda |
| 2010/0289817 A1 | 11/2010 | Meier et al. |
| 2010/0309295 A1 | 12/2010 | Chow |
| 2012/0212414 A1* | 8/2012 | Osterhout ............ G02B 27/017 345/158 |
| 2013/0117377 A1 | 5/2013 | Miller |
| 2013/0257686 A1 | 10/2013 | Baron et al. |

(Continued)

FOREIGN PATENT DOCUMENTS

| | | |
|---|---|---|
| DE | 10230911 | 2/2004 |
| DE | 102005048926 | 7/2006 |

(Continued)

OTHER PUBLICATIONS

Schwartz, Amanda Michelle, Augmenting Purchase Intent: An Empirical Study on the Effects of Utilizing Augmented Reality in Online Shopping, 2011, ProQuest Dissertations Publishing (Year: 2011).*

(Continued)

*Primary Examiner* — Brittney N Miller
(74) *Attorney, Agent, or Firm* — Staas & Halsey LLP

(57) ABSTRACT

A presentation device carries out a product presentation of a product. The presentation device includes a support element which is designed for placing on the head of a user, on which two display units are situated for stereoscopically displaying graphics data in front of the eyes of the user. The user is to be able to view the product at home without computer hardware specially purchased by him/her. For this purpose, the presentation device includes a memory for storing model data of a digital representation of the product, a simulation unit designed for simulating a relative position of the user with respect to the representation, and a rendering unit designed for generating the graphics data. The rendering unit is designed to display a stereoscopic view aimed at the representation from the simulated relative position, by the graphics data.

15 Claims, 2 Drawing Sheets

(56) References Cited

U.S. PATENT DOCUMENTS

2014/0267409 A1* 9/2014 Fein .................. G06F 3/011
                                                    345/633
2015/0309705 A1* 10/2015 Keeler ................ G06N 7/005
                                                    705/27.2

FOREIGN PATENT DOCUMENTS

DE    10 2014 011 116.4    7/2014
WO       2013/191689      12/2013

OTHER PUBLICATIONS

SiliconMicroDisplay Debuts at the 2012 International CES: SiliconMicroDisplay shows the world's first Full HD, 3D, mobile, augmented reality head-mounted display at the 2012 International CES, Nov. 15, 2011, PR Newswire (Year: 2011).*
4imprint; Augmented reality: Engaging the real and virtual worlds, Mar. 16, 2013, Marketing Weekly News (Year: 2013).*
German Office Action for German Priority Patent Application No. 10 2014 011 116.4, dated Oct. 31, 2014, 7 pages.

* cited by examiner

PRESENTATION DEVICE FOR CARRYING OUT A PRODUCT PRESENTATION

CROSS REFERENCE TO RELATED APPLICATIONS

This application is based on and hereby claims priority to German Application No. 10 2014 011 116.4 filed on Jul. 26, 2014, the contents of which are hereby incorporated by reference.

BACKGROUND

The present invention relates to a presentation device for carrying out a product presentation. The present invention also relates to a method for presenting the product at a presentation location at which the customer is present.

Before a customer purchases a particular product, for example, a motor vehicle, he/she would generally like to obtain an impression of the article to be purchased. For this purpose, the customer may visit the vendor's premises. However, in markets covering a wide area, for example, in rural areas, the business premises of the commercial establishment and the domicile of the customer, for example, his/her place of residence, may be separated by great distances. This makes it unappealing for the customer to visit the business premises. Internet commerce allows customers to obtain an impression of the goods for sale conveniently from home. However, this impression is generally not highly realistic, and the photographs of the products depicted on the Internet pages often do not address the particular questions that a customer may have. For example, it is not possible to estimate how large a particular object is, based on a photograph of the product. For example, if the customer is interested in a motor vehicle and would like to know how spacious the rear seat is, he/she is not able to assess this based on the photographs.

DE 10 2005 048 926 A1 describes a method for simulating the appearance of items of furniture at their place of destination. In this method, a customer at a home computer is able to create virtual models of both the items of furniture and the place of destination. The customer generates the model of the place of destination based on two-dimensional images, for example, photos of his/her living room. The virtual models of the item of furniture and the place of destination may then be combined with the aid of the computer.

US 2010/0289817 A1 also describes a method for illustrating a virtual object in real surroundings. In this method as well, the real surroundings are imaged by photographs, and a virtual model of the surroundings is formed from the photographs. The virtual objects may then be inserted into the model, overlaps of real objects imaged in the photographs with the virtual object being taken into account, so that the virtual object in the model may also be situated behind the real objects.

DE 102 30 911 A1 describes a sales portal for the Internet, via which a customer may obtain product data which describe the product three-dimensionally, so that the user is able to superimpose images of the product into his/her field of vision by so-called augmented-reality glasses, thereby obtaining the impression that the product is in front of the user in his/her familiar living environment. However, to generate the three-dimensional virtual objects, the user needs a relatively high-powered computer as well as the expensive augmented-reality data glasses. Therefore, this purchasing portal is usable only by people who have both hardware components, the high-powered personal computer and the expensive data glasses.

SUMMARY

One possible object is to provide a customer with a realistic impression of a product without the customer having to visit a showroom in person in order to view the product.

The inventor proposes a method for presenting the product at a predetermined presentation location. The presentation location may, for example, be a dwelling of the customer or offices of the customer. The presenting vendor does not have to be present. This must presently be distinguished from the sales location at which a manufacturer or vendor of the product is located. In the proposed method, the presentation location and the sales location may be geographically separated from each other, for example, by more than 20 kilometers, in particular, by more than 100 kilometers. According to the proposal, first, a customer's interest in purchasing the product is ascertained, for example, as a query about the product via the Internet or as a telephone call by the customer, in which the customer expresses interest in the product.

The method relies on a presentation device which is also an integral part of the proposal and includes a support element designed for placing on the head of the customer. Two display units are situated on the support element for stereoscopically displaying graphics data in front of the eyes of the user. In other words, each of the display units may display a view of a product depicted by the graphics data for one of the eyes, i.e., superimpose a digital model of the product into the field of view of the user, so that as a result, the user receives the impression that he/she is viewing a three-dimensional object in front of him/her. Here, a distinction is made between the product itself and its representation, i.e., the digital model of the product.

In addition, the presentation device includes a memory for storing the model data of the digital model of the product, and a simulation unit configured for simulating a relative position of the user with respect to the model, and a rendering unit designed for generating the graphics data to be displayed. The simulation unit simulates or models a view of the product from the perspective of a virtual position. 'Relative position' thus means that a virtual position of the user is assumed or predefined with respect to the digital model of the product via the simulation unit, and from this virtual position, the view of the model is simulated, i.e., it is ascertained, via the simulation unit, which sides of the model the user is able to see and how the perspective distortion looks from this position. The rendering unit is designed to depict the stereoscopic view of the model from the simulated relative position by the graphics data.

Thus, by the presentation device, all those components are provided which are necessary to depict and stereoscopically display the digital model from a view or relative position desired by the customer. The customer thus does not need his/her own home computer for generating the graphics data.

In the method, after the interest in purchasing has been ascertained, the model data which depict the digital model of the product are now stored in the memory of the presentation device as a function of the ascertained interest in purchasing. In addition, the simulation unit is configured in such a way that a presentation progression or presentation sequence is determined, i.e., configuration data are used to predefine how the digital model of the product is to be presented to the customer. Finally, the support element including the two display units is sent to the presentation location for the customer. This may take place, for example, by mail or courier.

The proposed presentation device and method thus provide the advantage that a customer who is interested in a certain product now receives a stereoscopically presented digital model of the product without having to own the expensive technical equipment, by placing the support element on his/her head, and the simulation unit and the rendering unit being operated, and the stereoscopic view of the model of the product thus being presented to the customer. In order to do this, it is not necessary for an attending person, for example, a vendor, also to travel to the customer's presentation location.

The memory for the model data, the simulation unit, and the rendering unit are also preferably situated on the support element. In other words, the presentation device constitutes a single, integrated device which the user may wear on his/her head. The presentation device provides all circuit elements required for generating the depiction of the product in order to be able to render the graphical content.

An additional advantage results if the presentation device includes a configuration interface which is designed to receive supplementary data about the model during a simulation and to store it in the memory. In other words, during the operation of the presentation device, the user may change the model by substituting or supplementing elements of the model, i.e., product characteristics. This makes it possible for the user to see different features of the product by the model.

An additional advantage results if the simulation unit in the presentation device includes an operating interface which is designed to receive a control signal during a simulation which describes a progression of the presentation of the product. In this specific embodiment, the simulation unit is designed to simulate a progression of the simulation according to the control signal. In other words, by the control signal, the model of the product may, for example, be viewed from different directions, or different operating modes of the product may be viewed. The control signal may, for example, be transmitted to the presentation device in a wired or wireless manner. For example, it may be provided that the user installs an operating program on his/her personal computer (PC) which generates the control signal as a function of operations by the user, for example, as a function of a signal of a computer mouse or a keyboard, and, for example, transmits it to the presentation device via a WLAN (wireless local area network) connection. The user may thus, for example, rotate the model of the product in front of his/her eyes.

It is particularly preferred that the presentation device also includes a data mixer. This data mixer is designed to receive camera data of a camera image from a data network, for example, from the Internet, and to integrate these camera data into the graphics data. The camera image is then also advantageously displayed to the user simultaneously with the model of the product. Thus, for example, a vendor may film him/herself at his/her sales location while explaining the product. The user may view both the digital model of the product and the face of the vendor at the presentation location. This often facilitates the comprehension of an explanation. In addition, the presentation device may be used twice, as an Internet video phone and for the simultaneous presentation of the digital model of the product.

An additional advantage results if the simulation unit is designed as a virtual reality simulator. Virtual reality (VR) is defined as the movement-dependent, interactive depiction of a virtual environment. The perspective from which the virtual environment is depicted to the user, here, the customer, by the two display units of the support element, is changed as a function of the head movements of the user, so that the user receives the impression of looking around in a room. The support element may, for example, comprise an arrangement made up of one or multiple acceleration sensors and/or one or multiple gyroscopic sensors, via which the head movements of the user are sensed. By providing a simulation unit including a virtual reality simulator, it is possible to present a particularly realistic model of the product to the customer, and the user is also able to move freely around the product in the virtual space, and is thus independently able to obtain a particularly comprehensive impression of the features of the product. In this specific embodiment, the display units on the support element are preferably designed to shield the eyes of the user in a light-proof manner. As a result, the immersion, i.e., the impression of the user of looking into a virtual space, is increased.

If the customer now uses the presentation device and has received an impression of the product and/or has configured the product according to his/her wishes by the configuration interface, according to a refinement of the method, an ordering data record is generated by the presentation device, which is transmitted by the presentation device and comprises product data for the product. The presentation device may transmit the ordering data record via a data network; in other words, the ordering data record is, for example, transmitted to the sales location. The data network may in particular be the Internet. After receiving the ordering data record, the product may then be manufactured or provided according to the product data. In other words, the customer may thus make an Internet purchase of the product via the presentation device.

An additional advantage results if the simulation unit is controlled from the sales location, i.e., the place where the vendor is located or resides, via a data network, i.e., in particular the Internet, while the customer wears the support element on his/her head at the presentation location, for example, at home, and the display units are in operation. Thus, the simulator may be controlled via the Internet from the sales location, in order to present to the customer the particular advantages of the product by remotely controlling the simulation unit and thus by determining the progression of the presentation of the product.

Following the presentation of the product to the customer at the presentation location, the support element may then be picked up, for example, via a courier or shipping service. As a support element which is to be worn on the head, the presentation device has a correspondingly compact design, and may therefore be transported in a space-saving and economical manner via a shipping service.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
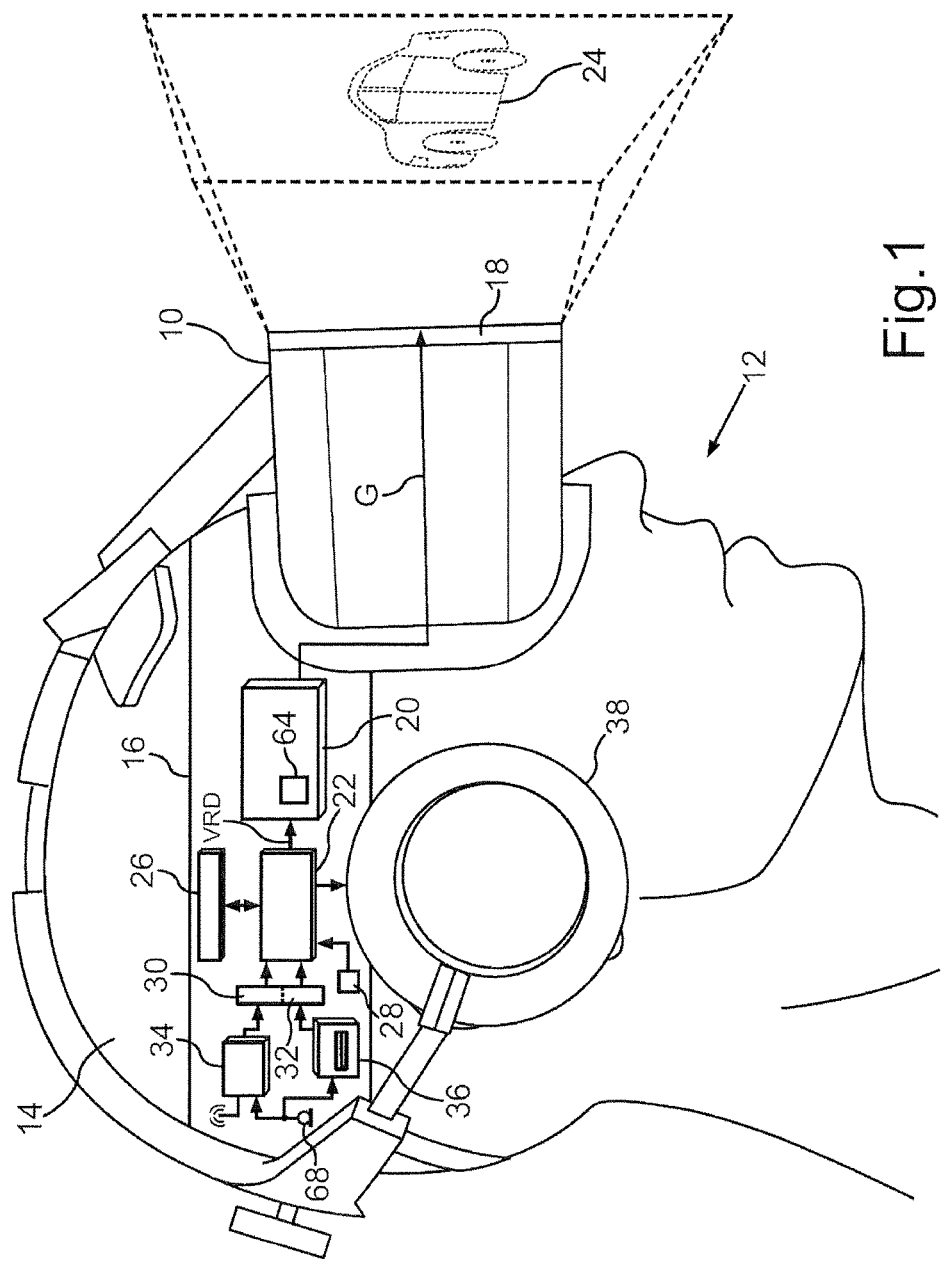
FIG. 1 shows a schematic representation of one specific embodiment of the proposed presentation device.

Reference will now be made in detail to the preferred embodiments of the present invention, examples of which are illustrated in the accompanying drawings, wherein like reference numerals refer to like elements throughout.

The exemplary embodiment described below is a preferred specific embodiment. However, in the exemplary embodiment, the described components each depict individual features which are to be considered independently of each other, each refining the proposals independently of the others, and are thus also to be viewed, individually or in a combination other than the depicted combination, as an integral part of the proposals. In addition, the described specific embodiment may also be supplemented by other features which have already been described.

FIG. 1 shows a presentation device 10 in a position of use, in which a user 12 wears the presentation device 10 on his/her head 14. In the presentation device 10, one display unit 18 may be provided on a support element 16 for each eye of the user 12. The support element 16 may, for example, be designed as a helmet or as glasses. As a result, the support element may be formed from a rigid material, for example, a plastic or carbon, or may partially or completely exhibit an elastic material, for example, an elastic band.

The display unit 18 may, for example, be a display screen or a retina projector. Each display unit 18 may be designed to be transparent, so that the user 12 is able to perceive his surroundings visually, so that display content of the display unit 18 in the field of view of the user 12 is overlaid with the visual impressions of real objects from the surroundings. However, each display unit 18 may also shield the eye in a light-proof manner, so that the user 12 perceives only the display content depicted by the display unit 18.

To generate the display content which is displayed to the user 12 by the display units 18, the presentation device 10 may include a rendering unit 20. The rendering unit 20 may also be situated on or attached to the support element 16, i.e., supported by it. The rendering unit 20 may, for example, be based on a GPU (graphical processing unit). The rendering unit 20 may be designed to receive object data VRD of virtual objects in a virtual space from a simulation unit 22, for example, vector data for describing surfaces of the objects and/or texture data for describing textures of the surfaces. The rendering unit 20 may generate graphics data G as a function of the object data VRD, which depict the display content and control the display units 18 using the graphics data G, so that they stereoscopically superimpose the display content, for example, a model 24 of a product, for example, a motor vehicle, into the field of vision of the user 12.

A perspective from which the model 24 is depicted, i.e., the arrangement of the virtual object in the virtual space from the viewpoint of the user, may be determined by the simulation unit 22. For this purpose, the simulation unit 22 may be based on a digital signal processor (DSP) and/or a FPGA (field-programmable gate array). The simulation unit 22 may receive model data from a memory 26 of the presentation device 10 which describe the product as a digital model. The simulation unit 22 and the memory 26 may, for example, also be situated on the support element 16 of the presentation device 10, i.e., supported by it.

The simulation unit 22 may calculate the perspective in the virtual space, i.e., ascertain the direction from which the user 12 is to look at the model 24 at the moment, based on the model data and, for example, as a function of a spatial position of the support element 16 ascertained by a sensor device 28. Based on the model data, the corresponding object data VRD may then be generated and output to the rendering device 20.

The sensor device 28 may, for example, be based on one or multiple acceleration sensors and/or one or multiple gyroscopic sensors. Three sensors are preferably provided from each sensor type, in order to ascertain a change of the spatial position of the support element 16 for all three spatial directions.

In addition, the presentation device 10 may include an operating interface 30 and/or a configuration interface 32. The operating interface 30 and/or the configuration interface 32 may each be linked to a data network radio module, or radio module 34 for short, for example, a WLAN radio module and/or a mobile radio module (UMTS or LTE). In addition or alternatively, the operating interface 30 and/or the configuration interface 32 may be linked to a connection device 36 for a data cable, for example, an Ethernet or a USB (universal serial bus) cable.

Via the operating interface 30, the user 12 may control a progression of the simulation which is carried out by the simulator device 22 for generating the object data VRD based on the model data, for example, from his/her home computer. This makes it possible for the user 12, for example, to set his/her perspective of the model 24, for example, change his/her virtual position in the virtual space with respect to the model 24, in order, for example, to reach the other side of the model 24.

The user 12 may, for example, also transmit supplementary data via the configuration interface 32 to the presentation device 10 using his/her home computer and, for example, via an Internet connection, so that the configuration interface 32 transmits this supplementary data as additional model data to the simulation unit 22, thus making it possible to supplement the model 24 with additional product features and/or substitute product features.

The presentation device 10 may be designed to be worn on the head 14 with all its components. In addition, it may be provided that an audio output device 38 is provided, for example, in the form of headphone ear cups, in order also to convey sound impressions to the user 12 while he/she is viewing the model 24.

The presentation device 10 does not have to belong to the user 12 in order to be able to use the presentation device 10 for viewing the representation 24 of a particular product.

Figure 2:
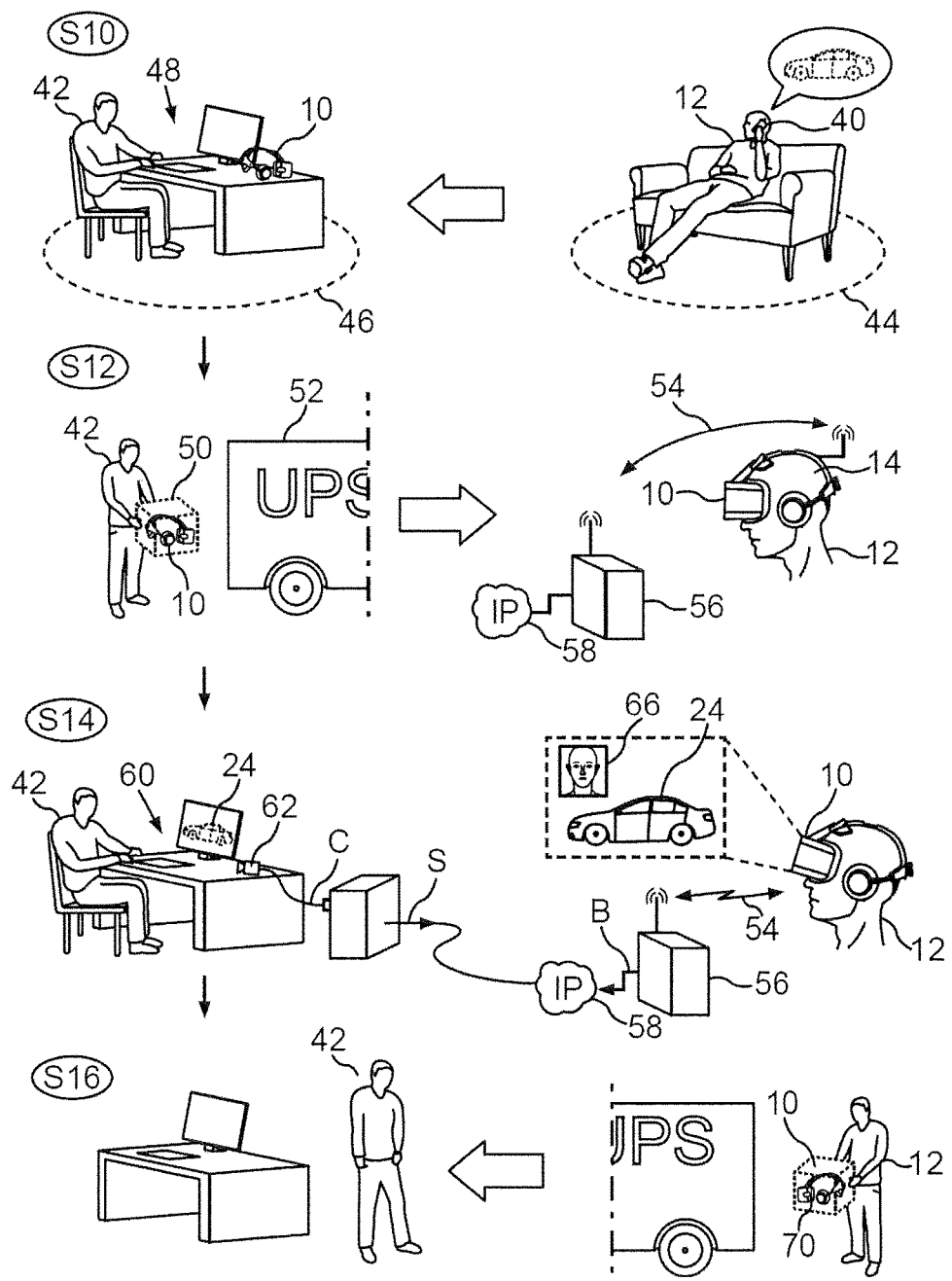
FIG. 2 shows an illustration of a sequence of one specific embodiment of the proposed method.

For this purpose, FIG. 2 depicts how the provision of the presentation device 10 may be integrated into a sales process. In S10, the user 12 as a customer may, for example, communicate his/her interest in the product, for example, the motor vehicle, to a vendor 42 via a telephone 40 or via an Internet connection with a product portal. To do this, the user 12 thus does not have to visit the vendor 42, but may remain at a presentation location 44 at which he/she would like to have the product presented, for example, at home or in a commercial facility. The vendor 42 may have the presentation device 10 ready at a sales location 46, for example, a branch of the manufacturer of the product, and according to the customer interest of the user 12, store model data about the product in question in the memory 26 of the presentation device 10 using a configuration device 48, for example, an operating computer.

In S12, the vendor 42 may then hand over the presentation device 10 thus prepared, for example, in a package 50, to a shipping service 52, in order to mail or send the presentation device 10 to the user 12. The user 12 may then place the presentation device 10 into the wearing position on his/her head 14, and optionally establish a communication link 54 between the presentation device 10, for example, to the radio module 34 or the connection device 36 on the one hand, and a home computer or office computer 56 or a router. Thus, the possibility may be provided for the presentation device 10 to establish communication data with the Internet 56, for example, based on the IP (Internet Protocol) standard.

In S14, the presentation of the product may now be carried out at the presentation location 44. The presentation device 10 may superimpose the model 24 into the field of vision of the user 12 in the described manner. It may be provided that the vendor 42 at the sales location 46 controls the presentation by generating a control signal S, by, for example, also displaying the model 24 using the operating computer 60, and selecting a perspective from which the model 24 is depicted, and controlling the simulation device 22 by the operating interface 30, via the control signal S, for example, via the Internet 58 and the communication connection 54, so that the perspective is also set for the user 12 via the simulation unit 22.

Additionally or alternatively, it may be provided that the vendor 42 is filmed by a camera 62, and camera data C are also transmitted to the presentation device 10 via the Internet 58 and the communication connection 54. The presentation device 10 may, for example, include a data mixer 64 in the rendering unit 20, for example, a program module, via which the camera data C are integrated into the graphics data G, so that a camera image 66 of the vendor 42 is also superimposed into the field of vision of the user 12 via the display units 18, i.e., displayed by the display units 18.

Configuration data may be carried out by the user and/or the vendor 42 for changing the model in the memory 26, which may take place via the configuration interface 32. In the presentation device 10, it may also be provided that a conversation between the customer or user 12 and the vendor 42 is transmitted via the data network, for example, the Internet 58 or a mobile radio network, and the user 12 and the vendor 42 may thereby speak to each other while the presentation device 10 is in operation. For this purpose, the presentation device 10 may also include a microphone 68. The voice of the vendor 42 may be output via the audio output device 38.

It may be provided that the user 12 generates an ordering data record B by the presentation device 10 and/or by a home computer 56, in which product data may be included which describe the configuration variant of the product which the user 12 would like to order. The vendor 42 may correspondingly configure the product based on the ordering data record B and sell it to the user 12.

After the user has used the presentation device 10, it may be provided for use by another customer. For this purpose, in S16, it may be provided that the user 12 hands over the presentation device 10 in another package 70, for example, hands it over to a courier or to a shipping service, and the presentation device 10 is thus returned to the vendor 42, i.e., generally from the presentation location 44 to the sales location 46.

Overall, the example shows how the proposals provide the possibility of implementing an autonomously operable product presentation by sending VR/AR glasses.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for presenting a digital representation of a product at a presentation location for a customer, comprising:

receiving, at a sales location, from the customer at the presentation location, an indication of the customer's interest in the product, wherein the sales location is remote from the presentation location;

configuring, at the sales location, a presentation device by storing modeling data depicting the digital representation of the product at a memory of the presentation device; and after the presentation device has been configured, sending the presentation device from the sales location to the presentation location, wherein the presentation device further comprises:

a support that fits on the customer's head while the customer is physically present in current surroundings of the customer;

a simulator to simulate a virtual viewing position of the customer with respect to the digital representation of the product;

a renderer to generate graphics data, to depict a stereoscopic view of the product, visually simulated at the virtual viewing position of the customer, wherein the graphics data is generated based on the modeling data and the virtual viewing position simulated by the simulator; and one or more displays supported by the support to present a simulation by stereoscopically displaying the graphics data to the customer, wherein the one or more displays are transparent, and the graphics data superimposes the digital representation of the product into the current surroundings of the customer.

2. The method according to claim 1, further comprising: after the simulation has been presented to the customer, sending the presentation device from the presentation location to the sales location.

3. The method according to claim 1, further comprising:

receiving supplementary data, via a configuration interface of the presentation device, about the digital representation of the product while the graphics data is being displayed; and storing the supplementary data in the memory of the presentation device.

4. The method according to claim 3, wherein the supplementary data changes characteristics of the product for the customer to see different available features using the digital representation of the product.

5. The method according to claim 1, further comprising receiving, via an operating interface of the simulator of the presentation device, a control signal while the graphics data is being displayed, wherein the control signal describes a progression for presenting the simulation to the customer, such that the simulation progresses according to the control signal.

6. The method according to claim 5, wherein the control signal changes the simulation such that the digital representation of the product is viewed from different directions and/or such that different operating modes of the product are displayed.

7. The method according to claim 5, wherein the control signal is generated as a function of an operation by the customer on a personal computer of the customer.

8. The method according to claim 1, further comprising:
receiving, via a data mixer of the renderer of the presentation device, camera data depicting a camera image; and
integrating the camera data into the graphics data.

9. The method according to claim 8, wherein the camera data depicts a camera image of a vendor, wherein the vendor is located at the sales location remote from the presentation location of the customer.

10. The method according to claim 1, further comprising determining, via the simulator of the presentation device, sequentially how the simulation will progress and how a view of the digital representation of the product will change.

11. The method according to claim 1, further comprising conveying sound impressions to the customer, via a headphone audio output device of the presentation device, while the customer is viewing the digital representation of the product.

12. The method according to claim 1, further comprising sensing, via a position sensing device of the presentation device, head movements of the customer.

13. The method according to claim 12, further comprising changing, via the simulator and the renderer of the presentation device, a virtual viewing angle of the digital representation of the product and the virtual viewing position from which the digital representation of the product is being virtually viewed, based on the head movements of the customer.

14. The method according to claim 1, further comprising:
after the presentation device is received at the presentation location, transmitting, from the presentation device to the sales location, an ordering data record of the customer, wherein the ordering data record comprises configuration data for the product;
receiving the ordering data record at the sales location; and
in response to receiving the ordering data record, preparing a product to sell to the customer according to the configuration data.

15. The method according to claim 1, further comprising controlling, via a data network, the simulator of the presentation device from the sales location, while the customer is viewing the digital representation of the product.

* * * * *